United States Patent
Scales et al.

(10) Patent No.: US 10,469,356 B2
(45) Date of Patent: Nov. 5, 2019

(54) IN-VEHICLE INFOTAINMENT SYSTEM INTEROPERABILITY TESTING DEVICE

(71) Applicant: NEXTGEN TECHNOLOGY LTD, Berkshire (GB)

(72) Inventors: James Scales, Berkshire (GB); Harbans Dass, Berkshire (GB)

(73) Assignee: NEXTGEN TECHNOLOGY LTD, Wokingham, Berkshire (GB)

( * ) Notice: Subject to any disclaimer, the term of this patent is extended or adjusted under 35 U.S.C. 154(b) by 67 days.

(21) Appl. No.: 15/753,294

(22) PCT Filed: Aug. 16, 2016

(86) PCT No.: PCT/GB2016/052535
§ 371 (c)(1),
(2) Date: Feb. 17, 2018

(87) PCT Pub. No.: WO2017/029491
PCT Pub. Date: Feb. 23, 2017

(65) Prior Publication Data
US 2018/0248782 A1    Aug. 30, 2018

(30) Foreign Application Priority Data
Aug. 17, 2015    (GB) .................................. 1514608.7

(51) Int. Cl.
*H04L 12/00*    (2006.01)
*H04L 12/26*    (2006.01)
(Continued)

(52) U.S. Cl.
CPC ............ *H04L 43/50* (2013.01); *H04L 41/069* (2013.01); *H04N 21/41422* (2013.01)

(58) Field of Classification Search
CPC .. H04L 43/50; H04L 41/069; H04N 21/41422
(Continued)

(56) References Cited

U.S. PATENT DOCUMENTS

| | | | |
|---|---|---|---|
| 9,419,802 B2* | 8/2016 | Lortz | .................... G06F 15/177 |
| 2004/0024868 A1 | 2/2004 | Drummond, II | |

(Continued)

FOREIGN PATENT DOCUMENTS

| | | |
|---|---|---|
| DE | 102014101917 A1 | 8/2014 |
| GB | 2514590 A | 12/2014 |
| WO | 2014078600 A2 | 5/2014 |

OTHER PUBLICATIONS

Patent Cooperation Treaty, International Search Report for PCT/GB2016/052535 dated Oct. 21, 2016, 4 pages.
Patent Cooperation Treaty, Written Opinion of the International Searching Authority for PCT/GB2016/052535 dated Oct. 21, 2016, 7 pages.

(Continued)

*Primary Examiner* — Frantz Coby
(74) *Attorney, Agent, or Firm* — Heslin Rothenberg Farley & Mesiti P.C.; Victor A. Cardona, Esq.

(57) ABSTRACT

An in-vehicle infotainment system interoperability testing device for testing the interoperability between an in-vehicle infotainment system and an auxiliary device includes an in-vehicle infotainment system interface arranged to communicatively connect the in-vehicle infotainment system with the testing device. An auxiliary device interface is arranged to communicatively connect the auxiliary device with the testing device. A control is arranged to generate auxiliary device control signals based on at least one test instruction. The control signals are arranged to be transmitted to the auxiliary device, thus causing the desired interaction between the in-vehicle infotainment system and the auxiliary device. An in-vehicle infotainment system behavior logging is arranged to generate a log of behavior in response to the control signals by receiving at least one response signal from the in-vehicle infotainment system, thereby outputting results of at least one interoperability test.

30 Claims, 14 Drawing Sheets

(51) Int. Cl.
*H04L 12/24* (2006.01)
*H04N 21/414* (2011.01)

(58) Field of Classification Search
USPC .................................................. 709/224, 225
See application file for complete search history.

(56) References Cited

U.S. PATENT DOCUMENTS

| | | |
|---|---|---|
| 2005/0245272 A1 | 11/2005 | Spaur et al. |
| 2014/0195808 A1* | 7/2014 | Lortz .................... G06F 15/177 713/170 |
| 2014/0303756 A1 | 10/2014 | Tarnutzer et al. |
| 2014/0344627 A1 | 11/2014 | Schaub et al. |
| 2014/0378063 A1 | 12/2014 | Nathwani et al. |

OTHER PUBLICATIONS

GB Intellectual Property Office, Search Report under Section 17 for GB Application No. GB1514608.7 dated Feb. 18, 2016, 2 pages.

Rohde & Schwarz, "Automate testing of your infotainment systems," Jan. 2015, 2 pages, Rohde & Schwarz Gmbh & Co.

Rohde & Schwarz, "R&S ATSI100, Infotainment Test System Fast and Extensive Testing in Automobile Production," Apr. 2010, 8 pages, Rohde & Schwarz GmbH & Co.

PCT/IB/326 Notification Concerning Transmittal of International Preliminary Report on Patentability, dated Mar. 1, 2018, with PCT/IB/373 International Preliminary Report on Patentability, dated Feb. 20, 2018, including cop of PCT/ISA/237 Written Opinion of the International Searching Authority, for PCT/GB2016/052535 filed Aug. 16, 2016.

* cited by examiner

| Time Stamp | Test Element | Success/Failure |
|---|---|---|
| XXX | START | ✓ |
| XXX | WAIT | ✓ |
| XXX | IGNITION ON | ✓ |
| XXX | WAIT EVENT - HEADSET CONNECTION | ✓ |
| XXX | IGNITION OFF | ✓ |
| XXX | FINISH | ✓ |

FIGURE 13

| Time Stamp | Test Element | Success/Failure |
|---|---|---|
| XXX | START | ✓ |
| XXX | WAIT | ✓ |
| XXX | IGNITION ON | ✓ |
| XXX | WAIT EVENT - HEADSET CONNECTION | ✗ |
| XXX | IGNITION OFF | ✓ |
| XXX | FINISH | ✓ |

FIGURE 14

IN-VEHICLE INFOTAINMENT SYSTEM INTEROPERABILITY TESTING DEVICE

CROSS REFERENCE TO RELATED APPLICATIONS

This application is a national stage filing under section 371 of International Application No. PCT/GB2016/052535 filed on Aug. 16, 2016, published in English on Feb. 23, 2017 as WO2017/029491 A1 and which claims priority to Great Britain Application No. 1514608.7 filed on Aug. 17, 2015, the entire disclosure of these applications being hereby incorporated herein by reference.

TECHNICAL FIELD

The present invention relates to an in-vehicle infotainment system (IVIS) interoperability testing device, a system for testing an IVIS, a method of testing an IVIS and a method of manufacturing an IVIS.

BACKGROUND

More frequently vehicles, such as cars, are being fitted with IVISs. An IVIS is a system for providing information and entertainment to the driver and/or passengers of a vehicle. IVISs are often capable of connecting to auxiliary devices, such as mobile telephones, games controllers, headsets and external hard drives. An IVIS may connect to auxiliary devices wirelessly, for example via Bluetooth® or WiFi. An IVIS may connect to auxiliary devices via a wired connection, for example via Universal Serial Bus (USB).

It will be appreciated that a great many types and models of auxiliary device are available. For instance, there are a great number of different makes and models of mobile telephones on the market today. Thus, a passenger or a driver of a vehicle may attempt to connect the IVIS to any make/model of mobile phone that may be in that passenger or driver's possession. It would be desirable for the IVIS to have the ability to connect with any auxiliary device that the passenger or driver should wish to connect to the IVIS. In addition, it would be desirable for the IVIS to provide a full complement of functionality, in terms of interoperability, to any such auxiliary device.

At present, in an attempt to fulfil these desires, the IVIS is manufactured, and then the interoperability between the IVIS and various auxiliary devices is tested manually in order to identify any interoperability faults. Once a fault is identified the IVIS is modified in an attempt to eradicate the fault.

There are a number of technical problems with manually testing IVIS interoperability. One of these problems is that, in order to conduct particular interoperability tests, it is often necessary to perform an activity at one of the auxiliary devices in dependence on a particular state of the IVIS, for instance directly after a specific activity has been performed at the IVIS, before another activity is initiated at the IVIS. It may be difficult, if not impossible, to conduct such a test manually.

Another problem with manual testing is that in order to test the interoperability between the IVIS and the auxiliary device, it may be necessary to control the auxiliary device such that the auxiliary device executes an activity at the exact same time that the IVIS executes another activity. In any case it would be difficult to determine if the two activities had indeed been executed simultaneously and whether the test had been carried out as planned.

In another example, it may be necessary to control the auxiliary device such that the IVIS and the auxiliary device execute a number of activities in a specific order relative to one another and at specific time intervals relative to one another. Again, this type of test may be very difficult, if not impossible, to perform manually.

SUMMARY

There are many different types of auxiliary device available, each having a different user interface. For this reason, it is very difficult to conduct a manual test with each different type of device because a manual operator will be required to possess an in-depth knowledge of each different user interface. This is rarely the case which can lead to errors in operation of auxiliary devices, leading to inaccurate tests.

The shortcomings of manual testing briefly described above, amongst others, may lead to a failure to identify interoperability faults and may lead to the misidentification of interoperability faults. This may result in the production of an IVIS that suffers from interoperability problems, thus providing an unreliable IVIS. Therefore, it would be desirable to provide a more reliable testing system.

According to an aspect of the invention there is provided an in-vehicle infotainment system interoperability testing device for testing the interoperability between an in-vehicle infotainment system and an auxiliary device, the testing device comprising: in-vehicle infotainment system interface means arranged to communicatively connect the in-vehicle infotainment system with the testing device; auxiliary device interface means arranged to communicatively connect the auxiliary device with the testing device; interoperability test instruction storage means arranged to store a plurality of interoperability test instructions for testing a desired interaction between the in-vehicle infotainment system and the auxiliary device; control means arranged to generate auxiliary device control signals based on at least one of the test instructions; wherein the control signals are arranged to be transmitted to the auxiliary device via the auxiliary device interface means, thus causing the desired interaction between the in-vehicle infotainment system and the auxiliary device; the testing device further comprising: in-vehicle infotainment system behaviour logging means arranged to generate a log of behaviour at the in-vehicle infotainment system in response to the control signals by receiving at least one response signal from the in-vehicle infotainment system via the in-vehicle infotainment system interface means, thereby outputting results of at least one interoperability test.

In this way, it is possible to maintain accurate and precise control over the auxiliary device based on interoperability test instructions. This allows the testing device to effectively perform interoperability test procedures that may not be possible to perform manually. The testing device uses the IVIS behaviour logging means to output results of at least one interoperability test. These results can be used to allow the IVIS to be modified such that it is more reliable.

The control means may be arranged to generate in-vehicle infotainment system control signals based on at least one of the test instructions; wherein the in-vehicle infotainment system control signals are arranged to be transmitted to the in-vehicle infotainment system via the in-vehicle infotainment system interface means, thus causing the desired interaction between the in-vehicle infotainment system and the auxiliary device.

The auxiliary device may comprise an interoperability channel arranged to allow communication between the auxiliary device and the in-vehicle infotainment system;

wherein the interoperability channel is for interoperability testing by the testing device; and the testing device does not use the interoperability channel to control the auxiliary device.

Preferably, the interoperability channel is separate from the auxiliary device interface means. The interoperability channel may be a Bluetooth® connection between the auxiliary device and in-vehicle infotainment system. The auxiliary interface means may comprise a physical connection and/or a WiFi connection between the auxiliary device and the testing device.

The control means may be arranged to generate auxiliary device control signals which emulate signals generated by a physical controller device. The control means may be arranged to generate auxiliary device control signals which emulate signals generated by a keyboard and/or mouse. The auxiliary device control signals which emulate keyboard/mouse control signals may be transmitted via the physical connection. The control means may comprise a keyboard/mouse emulation section comprising a conversion module arranged to receive PS2 type signals and output USB type signals.

The auxiliary device control signals which emulate keyboard/mouse control signals are used to navigate through menus etc. at the auxiliary device, for example by navigating towards a menu icon. In addition, the auxiliary device control signals which emulate keyboard/mouse control signals are used to select options at the auxiliary device, for example by selecting the menu icon. In addition, the control signals may allow the auxiliary device to perform operations that would not be possible to be performed by programming the auxiliary device itself, due to security restrictions at the auxiliary device.

The control means may be arranged to generate auxiliary device control signals which can control accessibility functionality at the auxiliary device. The term accessibility functionality, in this context, refers to the functionality built-into some auxiliary devices in order to assist people with disabilities in controlling these auxiliary devices. For example, typically an Apple iPhone® comprises 'switch control' functionality which allows the device to be controlled via simple inputs rather than complex touch-screen gestures. This aspect of the invention allows operations to be performed on Apple® devices that are not possible to be performed by programming the device using an application, due to security restrictions. Furthermore, since Apple® devices do not support a wired keyboard, it is possible to emulate the functionality of wired keyboard inputs by interacting with the accessibility functionality.

The control signals may be arranged to perform a series of selection steps by interacting with the accessibility functionality at the auxiliary device. This allows the interoperability testing device to navigate menu systems at the auxiliary device, and thus perform operations that are not possible to be performed programmatically.

The auxiliary device may comprise a control application for controlling the auxiliary device. The control means may be arranged to generate auxiliary device control signals for processing by the control application at the auxiliary device. The auxiliary device control signals for processing by the control application may be transmitted via the WiFi connection. In another example, a cellular connection may be used.

The control signals for processing by the control application may be used for functions other than menu navigation and option selection. The control application may be implemented as a thin-client at the auxiliary device. The control application may also be used for monitoring behaviour and/or activity at the auxiliary device and/or the in-vehicle infotainment system.

The testing device may further comprise auxiliary device behaviour logging means arranged to generate a log of behaviour at the auxiliary device in response to the control signals by receiving at least one response signal from the auxiliary device via the auxiliary device interface means; thereby outputting further results of the at least one interoperability test.

The log of behaviour at the in-vehicle infotainment system may comprise a list of in-vehicle infotainment system status frames each stored in association with a time stamp. The log of behaviour at the auxiliary device may comprise a list of auxiliary device status frames each stored in association with a time stamp.

Some of the plurality of interoperability test instructions may be associated with a type of auxiliary device and a desired activity to be performed at that type of auxiliary device. The testing device may further comprise an interoperability test selector arranged to select at least one of the plurality of interoperability test instructions.

The interoperability test selector may be arranged to select at least one of the plurality of interoperability test instructions based on the type of the auxiliary device and the desired activity to be performed at the auxiliary device; wherein the control means is arranged to generate the auxiliary device control signals based on the selected interoperability test instruction.

Some of the plurality of interoperability test instructions may be associated with a type of in-vehicle infotainment system and a desired activity to be performed at that type of in-vehicle infotainment system.

The interoperability test selector may be arranged to select at least one of the plurality of interoperability test instructions based on the type of the in-vehicle infotainment system and the desired activity to be performed at the in-vehicle infotainment system; wherein the control means is arranged to generate the in-vehicle infotainment system control signals based on the selected interoperability test instruction.

Some of the plurality of interoperability test instructions may be associated with an external actuator and a desired activity to be performed at that external actuator. The interoperability test selector may be arranged to select at least one of the plurality of interoperability test instructions based on the type of the external actuator and the desired activity to be performed at the external actuator. The control means may be arranged to generate the external actuator control signals based on the selected interoperability test instruction.

The external actuator may be a robotic arm. The robotic arm may be arranged to make physical actions to manipulate the in-vehicle infotainment system and/or the auxiliary device.

Some of the plurality of interoperability test instructions may be associated with a sensor and a desired activity to be performed at that sensor. The interoperability test selector may be arranged to select at least one of the plurality of interoperability test instructions based on the type of the sensor and the desired activity to be performed at the sensor. The control means may be arranged to generate the sensor control signals based on the selected interoperability test instruction.

The sensor may be arranged to record external data and/or recognise events and/or recognise images.

The testing device may further comprise scheduled sequence storage means arranged to store a scheduled sequence of desired activities to be performed at the auxiliary device and/or the in-vehicle infotainment system; wherein the interoperability test selector is arranged to select interoperability test instructions based on the scheduled sequence.

The interoperability test routine scheduler may be arranged to: execute a first desired activity to be performed at the auxiliary device or the in-vehicle infotainment system by causing the interoperability test selector to select a first test instruction; and then execute a second desired activity to be performed at the auxiliary device or the in-vehicle infotainment system by causing the interoperability test selector to select a second test instruction.

The interoperability test routine scheduler may cause the test instructions for executing the first desired activity to be processed and executed before causing the test instructions for executing the second desired activity to be processed. Alternatively, the interoperability test routine scheduler may cause the test instructions for executing the first and the second desired activities to be processed before causing the first and the second desired activities to be executed.

The interoperability test routine scheduler may be arranged to determine whether the first desired activity has been performed at the auxiliary device or the in-vehicle infotainment system using the behaviour logging means; and if the first desired activity has been performed, the interoperability test routine scheduler is arranged to proceed to execute the second desired activity.

The testing device may further comprise a user interface arranged to allow a user to generate the scheduled sequence of desired activities to be performed at the auxiliary device and/or the in-vehicle infotainment system.

The user interface may be arranged to allow a user to input delay instructions between desired activities to be performed at the auxiliary device and/or the in-vehicle infotainment system.

The user interface may be arranged to allow a user to input logical commands between the desired activities to be performed at the auxiliary device and/or the in-vehicle infotainment system.

The testing device may further comprise auxiliary device identification means arranged to identify the type of the auxiliary device by analysing signals received from the auxiliary device via the auxiliary device interface means.

The testing device may further comprise a user interface arranged to allow a user to select the type of in-vehicle infotainment system to be connected or connected to the in-vehicle infotainment system interface means.

The testing device may further comprise in-vehicle infotainment system analysis means arranged to receive identification signals, indicative of the type of in-vehicle infotainment system connected to the testing device, from the in-vehicle infotainment system interface means, and analyse whether the type of in-vehicle infotainment system indicated by the identification signals corresponds with the type of in-vehicle infotainment system selected by the user.

The interoperability test selector may be arranged to select at least one of the plurality of interoperability test instructions based on the type of auxiliary device identified. The interoperability test instructions storage means may comprise an auxiliary device type look-up table arranged to store a plurality of types of auxiliary device. The interoperability test instructions storage means may comprise an auxiliary device activity look-up table arranged to store a plurality of desired activities to be performed at an auxiliary device.

The interoperability test instructions storage means may comprise an auxiliary device interoperability test instructions look-up table arranged to store a plurality of auxiliary device interoperability test instructions. The interoperability test instructions storage means may comprise an in-vehicle infotainment system type look-up table arranged to store a plurality of types of in-vehicle infotainment system.

The interoperability test instructions storage means may comprise an in-vehicle infotainment system activity look-up table arranged to store a plurality of desired activities to be performed at an in-vehicle infotainment system.

The interoperability test instructions storage means may comprise an in-vehicle infotainment system interoperability test instructions look-up table arranged to store a plurality of in-vehicle infotainment system interoperability test instructions. The auxiliary device interface means may comprise: a first channel arranged to communicate a first type of auxiliary device control signal to the auxiliary device; and a second channel, distinct from the first channel, arranged to communicate a second type of control signal to the auxiliary device; wherein the control means is arranged to generate the first type and the second type of auxiliary device control signals based on at least one interoperability test instruction and cause the auxiliary device control signal to be transmitted to the auxiliary device via the auxiliary device interface means.

The first channel may comprise a physical connection between the auxiliary device and the testing device. The physical connection may be via a USB connection.

The second channel may comprise a wireless connection between the auxiliary device and the testing device. The wireless connection may be via a WiFi connection.

The testing unit may further comprise: in-vehicle infotainment system expected behaviour storage means arranged to store expected behaviour of the in-vehicle infotainment system in response to the control signals; and fault identification means arranged to compare the log of behaviour at the in-vehicle infotainment system with the expected behaviour of the in-vehicle infotainment system in order to identify a mismatch, thus identifying an interoperability fault; and fault logging means arranged to log the identified interoperability fault.

The testing unit may further comprise: auxiliary device expected behaviour storage means arranged to store expected behaviour of the auxiliary device in response to the control signals; and fault identification means arranged to compare the log of behaviour at the auxiliary device with the expected behaviour of the auxiliary device in order to identify a mismatch, thus identifying an interoperability fault; and fault logging means arranged to log the identified interoperability fault.

The in-vehicle infotainment system interface means may comprise a controller area network (CAN) interface for controlling and monitoring the in-vehicle infotainment system via its controller network interface.

The in-vehicle infotainment system interface means may comprise a local interconnect network (LIN) for controlling a steering wheel connected to the in-vehicle infotainment system.

The in-vehicle infotainment system interface means may comprise a resistive ladder for controlling a steering wheel connected to the in-vehicle infotainment system.

The in-vehicle infotainment system can also be controlled by a relay operating as a switch to control the in-vehicle infotainment system power supply and/or a control signal.

The testing device may further comprise: sound output interface means arranged to establish a connection between at least one sound output device, or a plurality of sound output devices, and the testing device; wherein the control means is arranged to generate sound output device control signals based on at least one of the test instructions; and wherein the control means is arranged to cause the control signals to be transmitted to the at least one sound output device, or plurality of sound output devices.

The sound output from the sound output device may be arranged to be input into a microphone at the auxiliary device or a microphone at the in-vehicle infotainment system.

The testing device may further comprise: sound input interface means arranged to establish a connection between at least one sound input device, or a plurality of sound input devices, and the testing device; and sound recording means arranged to record sound signals received via the sound input interface means.

The sound input device or devices may be arranged to receive sound from a speaker at the auxiliary device and/or a speaker at the in-vehicle infotainment system.

The testing device may further comprise: image input interface means arranged to establish a connection between at least one image input device, or a plurality of image input devices, and the testing device; and image recording means arranged to record images received at the at least one image input device, or the plurality of image input devices.

The image input device or devices may be arranged to receive images displayed at a display at the auxiliary device and/or a display at the in-vehicle infotainment system. The image input device may also be used in an image recognition mode to identify interoperability errors by comparing the received image with an expected image. The testing device may further comprise a display or a touch-screen display.

The auxiliary device interface means may be arranged to establish connections between a plurality of auxiliary devices and the testing device; and wherein the control means is arranged to generate auxiliary device control signals based on the test instructions; and the control means is arranged to cause the controls signals to be transmitted to the auxiliary devices via the auxiliary device interface means, thus causing the desired interaction between the in-vehicle infotainment system and the auxiliary devices. The plurality of auxiliary devices may comprise different types of auxiliary device.

The auxiliary device behaviour logging means may be arranged to log behaviour at the auxiliary devices in response to the control signals by receiving response signals from the auxiliary devices via the auxiliary device interface means; thereby outputting further results of the at least one interoperability test.

The interoperability test routine scheduler may be arranged to store a scheduled sequence of desired activities to be performed at the auxiliary devices and the in-vehicle infotainment system; wherein the interoperability test selector is arranged to select interoperability test instructions based on the scheduled sequence.

It will be appreciated that in any of the features above, where the testing device operates with at least one auxiliary device, the feature may be appropriate for the testing device operating with a plurality auxiliary devices.

According to an aspect of the invention there is provided a testing device for testing the interoperability between an in-vehicle infotainment system and an auxiliary device, the testing device comprising: auxiliary device interface means arranged to communicatively connect the auxiliary device with the testing device; interoperability test instruction storage means arranged to store a plurality of interoperability test instructions; control means arranged to generate auxiliary device control signals based on at least one of the test instructions; wherein the control signals are arranged to be transmitted to the auxiliary device via the auxiliary device interface means; the testing device further comprising: logging means arranged to generate a log of behaviour in response to the control signals by receiving at least one response signal, thereby outputting results of at least one interoperability test.

According to another aspect of the invention there is provided an interoperability testing system comprising: an in-vehicle infotainment system interoperability testing device; an in-vehicle infotainment system communicatively connected to the testing device; an auxiliary device communicatively connected to the testing device; the testing device comprising: interoperability test instruction storage means arranged to store a plurality of interoperability test instructions for testing a desired interaction between the in-vehicle infotainment system and the auxiliary device; control means arranged to generate auxiliary device control signals based on at least one of the test instructions; wherein the control signals are arranged to be transmitted to the auxiliary device, thus causing the desired interaction between the in-vehicle infotainment system and the auxiliary device; the testing device further comprising: in-vehicle infotainment system behaviour logging means arranged to generate a log of behaviour at the in-vehicle infotainment system in response to the control signals by receiving at least one response signal from the in-vehicle infotainment system, thereby outputting results of at least one interoperability test.

According to another aspect of the invention there is provided a method of testing the interoperability of an in-vehicle infotainment system with an auxiliary device, the method comprising the steps of: storing interoperability test instructions for testing a desired interaction between the in-vehicle infotainment system and the auxiliary device; communicatively connecting the in-vehicle infotainment system with an in-vehicle infotainment system testing device; communicatively connecting the auxiliary device with the testing device; generating auxiliary device control signals based on at least one of the test instructions; transmitting the auxiliary device control signals to the auxiliary device, thus causing the desired interaction between the in-vehicle infotainment system and the auxiliary device; and receiving at least one response signal from the in-vehicle infotainment system; and generating a log of behaviour at the in-vehicle infotainment system in response to the control signals, thereby outputting results of at least one interoperability test.

According to another aspect of the invention there is provided a computer program product comprising a computer readable storage medium carrying an executable computer program comprising code portions, which when loaded and run on an in-vehicle infotainment system testing device, cause the in-vehicle infotainment system testing device to execute a method of testing the interoperability of an in-vehicle infotainment system with an auxiliary device, the method comprising the steps described above.

A computer program product comprising a machine readable data carrier on which is carried a computer program as described above.

According to another aspect of the invention there is provided a method of manufacturing an in-vehicle infotainment system, the method comprising the steps of: storing, at an in-vehicle infotainment system testing device, interoperability test instructions for testing a desired interaction between the in-vehicle infotainment system and an auxiliary device; communicatively connecting the in-vehicle infotainment system with the in-vehicle infotainment system testing device; communicatively connecting the auxiliary device with the testing device; generating auxiliary device control signals based on at least one of the test instructions; transmitting the auxiliary device control signals to the auxiliary device, thus causing the desired interaction between the in-vehicle infotainment system and the auxiliary device; and receiving at least one response signal from the in-vehicle infotainment system; generating a log of behaviour at the in-vehicle infotainment system in response to the control signals, thereby outputting results of at least one interoperability test; and using results of the at least one interoperability test to manufacture an in-vehicle infotainment system.

According to another aspect of the invention there is provided an in-vehicle infotainment system interoperability testing device for testing the interoperability between an in-vehicle infotainment system and an auxiliary device, the testing device comprising: in-vehicle infotainment system interface means arranged to communicatively connect the in-vehicle infotainment system with the testing device; auxiliary device interface means arranged to communicatively connect the auxiliary device with the testing device; interoperability test instruction storage means arranged to store a plurality of interoperability test instructions for testing a desired interaction between the in-vehicle infotainment system and the auxiliary device; control means arranged to generate auxiliary device control signals based on at least one of the test instructions; wherein the control signals are arranged to be transmitted to the auxiliary device via the auxiliary device interface means, thus causing the desired interaction between the in-vehicle infotainment system and the auxiliary device; the testing device further comprising: in-vehicle infotainment system behaviour logging means arranged to generate a log of behaviour at the in-vehicle infotainment system in response to the control signals by receiving at least one response signal from the in-vehicle infotainment system via the in-vehicle infotainment system interface means, thereby outputting results of at least one interoperability test; an interoperability test selector arranged to select at least one of the plurality of interoperability test instructions, wherein the control means is arranged to generate the control signals based on the selected interoperability test instruction; scheduled sequence storage means arranged to store a scheduled sequence of desired activities to be performed at the auxiliary device and/or the in-vehicle infotainment system; wherein the interoperability test selector is arranged to select interoperability test instructions based on the scheduled sequence; and a user interface arranged to allow a user to generate the scheduled sequence of desired activities to be performed at the auxiliary device and/or the in-vehicle infotainment system, wherein the user interface allows a user to graphically build the scheduled sequence of desired activities by selecting one or more of a plurality of available test elements.

According to another aspect of the invention there is provided a method of testing the interoperability of an in-vehicle infotainment system with an auxiliary device using an in-vehicle infotainment system testing device, the method comprising the steps of: storing interoperability test instructions for testing a desired interaction between the in-vehicle infotainment system and the auxiliary device; communicatively connecting the in-vehicle infotainment system with the in-vehicle infotainment system testing device; communicatively connecting the auxiliary device with the testing device; generating auxiliary device control signals based on at least one of the interoperability test instructions; transmitting the control signals to the auxiliary device, thus causing the desired interaction between the in-vehicle infotainment system and the auxiliary device; receiving at least one response signal from the in-vehicle infotainment system; generating a log of behaviour at the in-vehicle infotainment system in response to the control signals, thereby outputting results of at least one interoperability test; wherein the method comprises the further steps of: allowing a user to generate a scheduled sequence of desired activities to be performed at the auxiliary device and/or the in-vehicle infotainment system using a user interface, wherein the user interface allows a user to graphically build the scheduled sequence of desired activities by selecting one or more of a plurality of available test elements; storing a scheduled sequence of desired activities to be performed at the auxiliary device and/or the in-vehicle infotainment system; and selecting interoperability test instructions based on the scheduled sequence with the control signals being based on the selected interoperability test instructions.

According to another aspect of the invention there is provided a computer program product comprising a computer readable storage medium carrying an executable computer program comprising code portions, which when loaded and run on an in-vehicle infotainment system testing device, cause the in-vehicle infotainment testing device to execute a method of testing the interoperability between an in-vehicle infotainment system and an auxiliary device, the method comprising the steps described above.

According to another aspect of the invention there is provided a computer program for building a scheduled sequence of desired activities for use with an in-vehicle infotainment interoperability system testing device according to any testing device described previously which comprises code portions which, when executed on a computer, cause the computer to execute a method comprising the steps of: presenting the user with a graphical user interface, displaying a plurality of test elements within the graphical user interface, and allowing their selection and ordering by a user to create a scheduled sequence of desired activities for output to an in-vehicle infotainment interoperability system testing device.

BRIEF DESCRIPTION OF THE DRAWINGS

Preferred features of the present invention will now be described, purely by way of example, with reference to the accompanying drawings in which:

FIG. 13 illustrates an example of a possible log of test results; and

FIG. 14 illustrates an alternative example of a possible log of test results.

DETAILED DESCRIPTION

Figure 1:
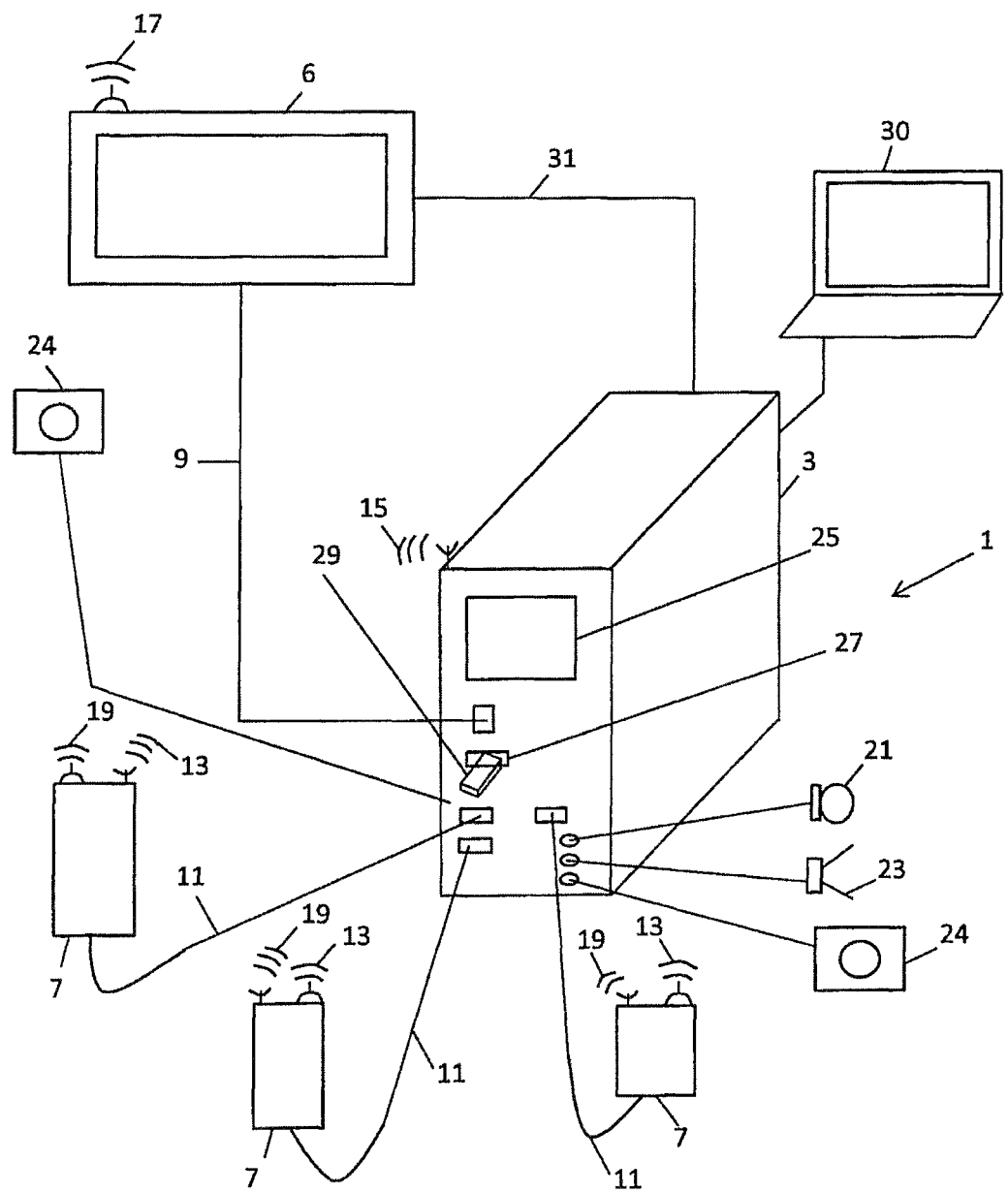
FIG. 1 schematically shows the basic general architecture of an IVIS interoperability testing system.

Referring to FIG. 1, there is provided an IVIS interoperability testing system 1. The testing system 1 comprises an IVIS interoperability testing device 3 which is connected to an IVIS 6, such that that the IVIS 6 and the testing device 3 can communicate with one another. The testing device 3 is also connected to a number of auxiliary devices 7, such that each one of the auxiliary devices 7 and the testing device 3 can communicate with one another. In this example, the auxiliary devices 7 are mobile telephones 7.

The testing device 3 is connected to the IVIS 6 via a wired connection 9. The testing device 3 is also connected to each mobile telephone 7 via a wired connection 11 and a wireless connection. Each one of the mobile telephones 7 has a WiFi transceiver 13 which communicates with a WiFi transceiver 15 at the testing device 3. Thus, a wireless communications connection is established between the testing device 3 and each one of the mobile telephones 7.

In other examples, the testing device 3 is connected to each auxiliary device 7 via: a wired connection but not a wireless connection or a wireless connection but not a wired connection. In another example, the testing device 3 is not connected to any of the auxiliary devices 7, and a log of behaviour is created at the auxiliary device 7 for later analysis.

The IVIS 6 comprises a Bluetooth® transceiver 17 which is used to communicate with each one of the mobile telephones 7, each having a corresponding Bluetooth® transceiver 19. In this example, Bluetooth® is used to connect the IVIS 6 to one of the mobile telephones 7 so that the mobile telephone 7 can be used to communicate with and control the IVIS 6. In addition, the IVIS 6 may be used to control the mobile telephone 7. It is possible that the IVIS 6 and the auxiliary device 7 may be connected via a WiFi connection.

The interoperability of the IVIS 6 may refer to the ability of the IVIS 6 to operate with the mobile telephone 7 and other auxiliary devices, for example by reliably communicating with the telephone 7 or by enabling reliable control of the IVIS 6 by the telephone 7 and vice versa. It is the interoperability of the IVIS 6 with at least one of the auxiliary devices 7 that the testing device 3 is designed to test.

The testing device 3 is connected to a microphone 21, which can be used to record sounds, and a speaker 23, which can be used to output sound. The microphone 21 and the speaker 23 allow the testing device 3 to simulate real-world situations where audio is present for the purposes of testing interoperability. In FIG. 1, only one microphone 21 and one speaker 23 are shown; however, it will be appreciated that a plurality of microphones and speakers could be used. For example, there may be four microphones and four speakers; one for each of the auxiliary devices 7 and the IVIS 6.

The testing device 3 is connected to image input devices, such as cameras 24 or video recorders. The cameras 24 can be arranged to receive images of displays at the auxiliary devices 7 and the IVIS 6. Thus, images of these displays can be stored in association with test result data. This provides more detailed information concerning behaviour at the auxiliary devices 7 and the IVIS 6. The connector for the camera(s) 21 may be provided on the rear panel of the testing device 3 whereas the connectors for the auxiliary devices 7 may be provided on the front panel of the testing device 3.

In another example, the IVIS 6 and the auxiliary devices 7 have image output means which can transmit information regarding the output at their respective displays directly to the testing device 3 without the need for the cameras 24.

The testing device 3 comprises a touch-screen display 25 which can be used to provide visual information to a user. The touch-screen display 25 can also be used to control the testing device 3.

The testing device 3 also comprises a USB device interface 27 which can be used to connect an auxiliary device, such as an external storage device 29 or a USB media player, to the testing device 3. The USB device interface 27 allows the testing device 3 to test the interoperability of the IVIS 6 with an auxiliary device 29 connectable via USB. A wired connection 31 is used to connect a USB input port at the IVIS 6 to the testing device 3 so that the external storage device 29 can be connected directly to the testing device 3 rather than to the IVIS 6 itself. It will be appreciated that a plurality of USB device interfaces 27 may be provided which would allow the testing device 3 to test the interoperability of the IVIS 6 with a plurality of auxiliary devices 29.

The USB device interface 27 comprises a switch which can be used to turn off/on the power/communication between the testing device 3 and the external storage device 29. Thus, the interoperability of the IVIS 6 and the external storage device 29 can be tested by monitoring the behaviour of the IVIS 6 when the external storage device 29 is connected and disconnected. The switch may be implemented in hardware or software.

In one example, there are two USB device interfaces 27 that can connect to two different external storage devices 29. This provides a way of testing how the IVIS 6 responds to two different devices 29 being connected to the IVIS 6, one after another.

There is a voltage and current monitor (not shown) at the testing device 3 which monitors the voltage and current supplied to the external storage device 29 by the IVIS 6. A log of the voltage and current is stored in association with a record of the behaviour at the IVIS 6 in response to test instructions. This log is used to identify faults in interoperability between the IVIS 6 and the external storage device 29.

The system 1 includes an external computer 30 connected to the testing device 3. The external computer 30 can be used to design and upload test routines to the testing device 3.

Figure 2:
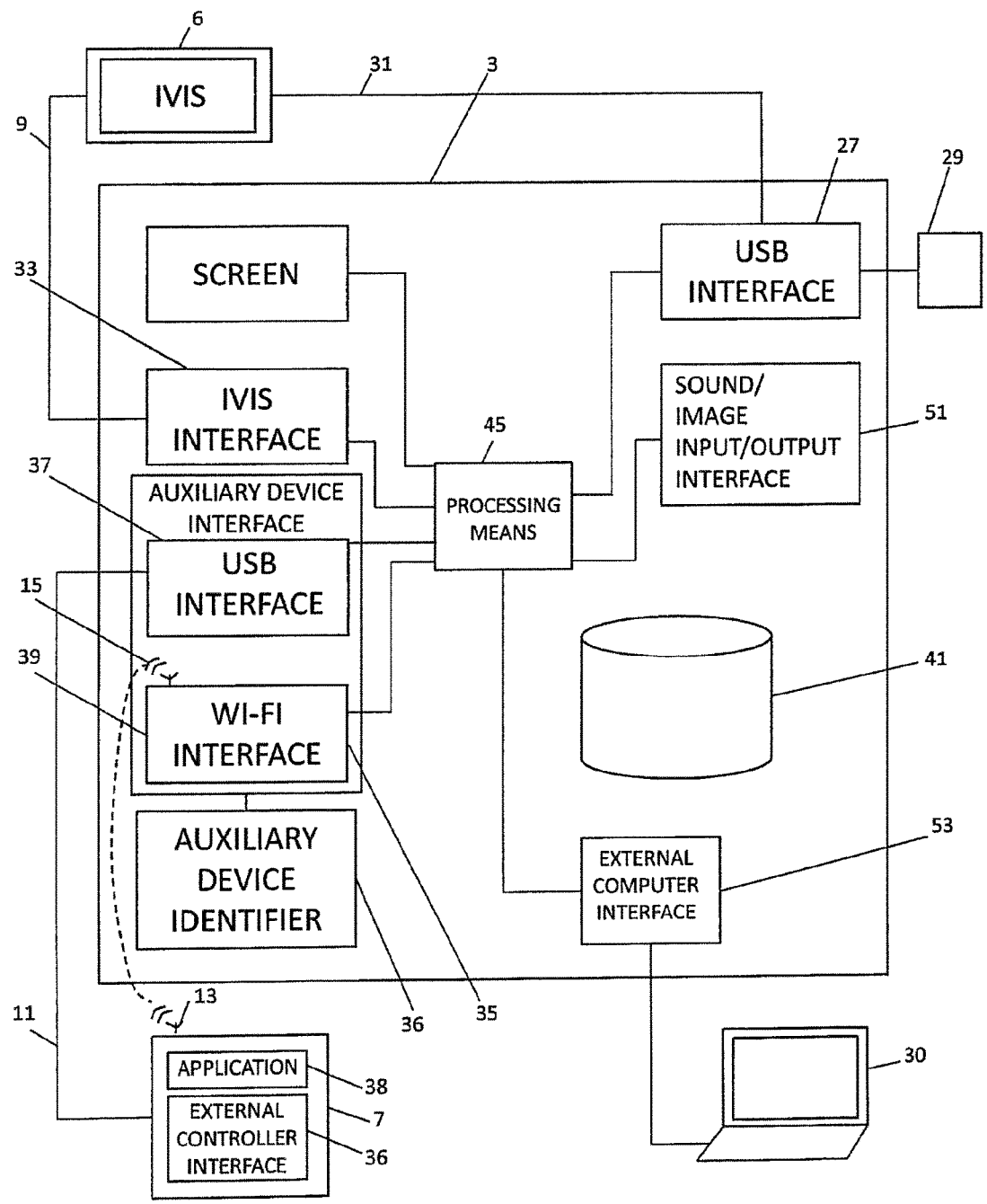
FIG. 2 schematically shows an overview of an IVIS interoperability testing device.

Referring to FIG. 2, the testing device 3 comprises IVIS interface means 33 which is used to establish a connection between the IVIS 6 and the testing device 3 such that the IVIS 6 and the testing device 3 can communicate with one another. In this example, a wired connection 9 is used to communicatively connect the IVIS 6 to the testing device 3; however, it will be appreciated that a wireless connection could also be used.

The testing device 3 comprises auxiliary device interface means 35 which is used to establish a connection between the auxiliary device 7 and the testing device 3 such that the auxiliary device 7 and the testing device 3 can communicate with one another. In this example, the auxiliary device interface means 35 comprises USB interface means 37 and WiFi interface means 39. There is also an auxiliary device identifier 36 which analyses signals received from the auxiliary device 7 via the interface means 35 and identifies the type of auxiliary device 7 connected to the testing device 3.

The USB interface means 37 is used to establish a wired connection between the auxiliary device 7 and the testing device 3 via a USB cable 11. The USB interface means 37 can be used to control the auxiliary device 7 by transmitting control signals to external controller interface means 36 on-board the auxiliary device 7. The USB interface means 37 can be used to communicate with the auxiliary device 7 by transmitting and receiving communication signals to and from the external controller interface means 36 on-board the auxiliary device 7.

The WiFi interface means 39 is used to establish a wireless connection between the auxiliary device 7 and the testing device 3 via the WiFi transceivers 13, 15. The WiFi interface 39 can be used to control the auxiliary device 7 by transmitting control signals which are processed by an application 38 at the auxiliary device 7. The WiFi interface means 39 can be used to communicate with the auxiliary device 7 by transmitting and receiving communication signals to and from the application 38 at the auxiliary device 7.

Figure 3:
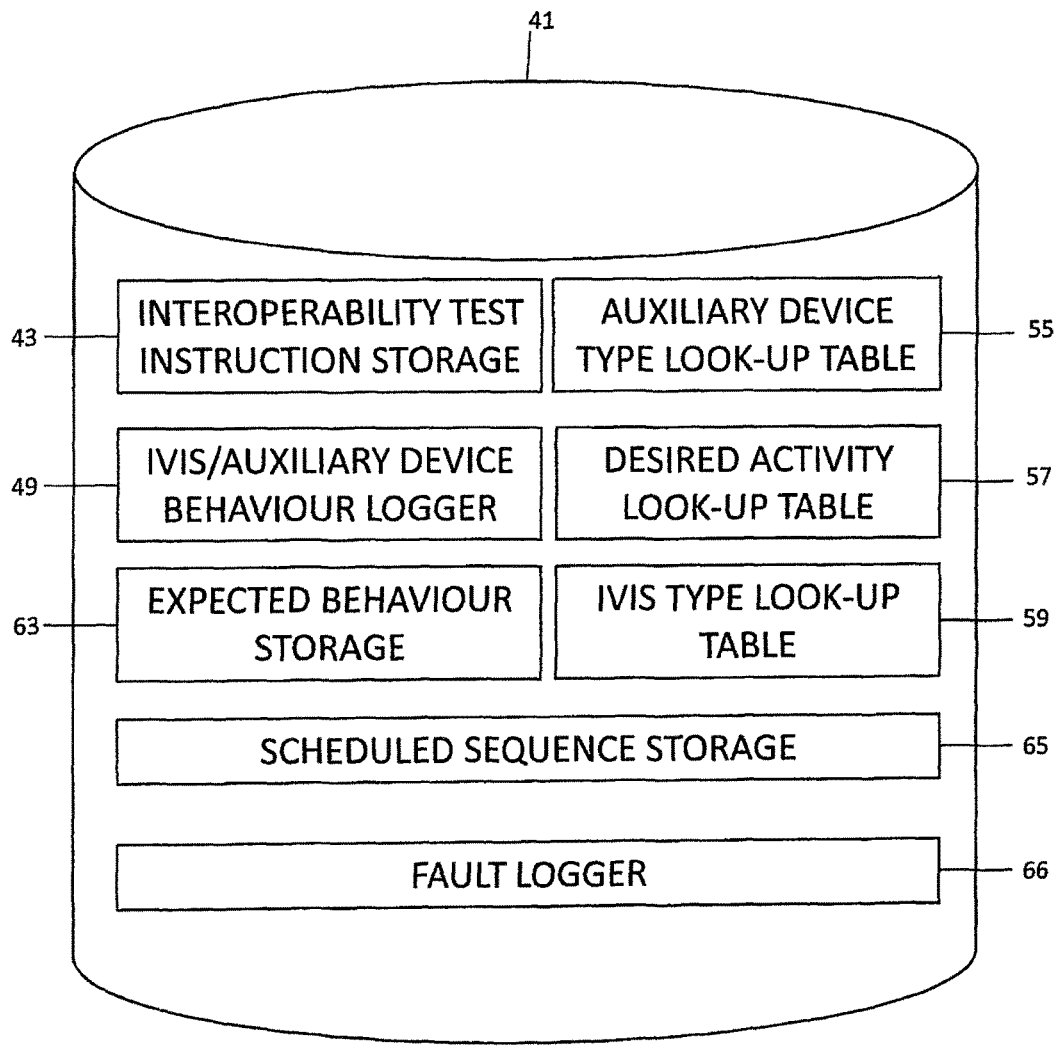
FIG. 3 schematically shows an overview of storage means of the IVIS interoperability testing device.

The testing device 3 comprises storage means 41, which in this example is an electronic storage device such as a hard drive. Referring to FIG. 3, the storage means 41 comprises interoperability test instruction storage means 43, which is used to store interoperability test instructions. The interoperability test instructions are for testing a desired interaction between the IVIS 6 and the auxiliary device 7. The storage means 41 may be used to store the computer program for conducting the test routine.

Figure 4:
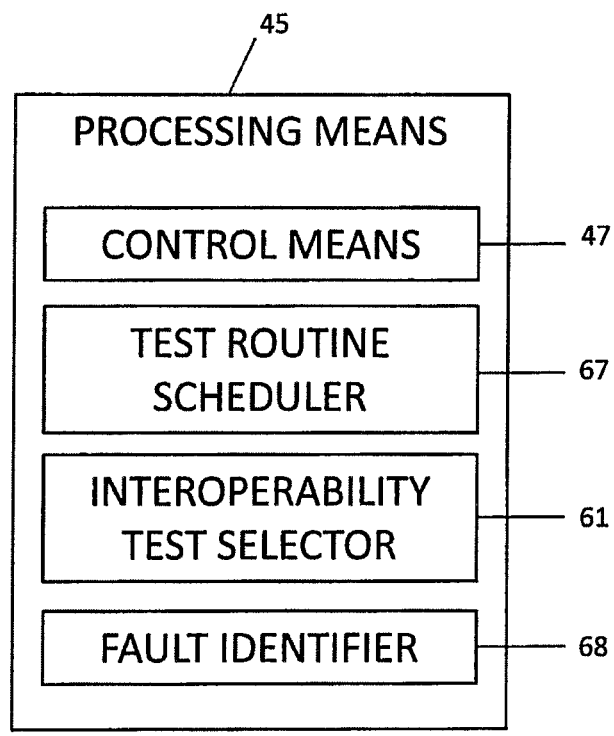
FIG. 4 schematically shows an overview of processing means of the IVIS interoperability testing device.

The testing device 3 comprises processing means 45 which may be, for example, a central processing unit. Referring to FIG. 4, the processing means 45 comprises control means 47 which generates control signals based on the interoperability test instructions stored at the storage means 41. These control signals are then transmitted to the IVIS and/or the auxiliary device 7 using the IVIS interface means 33 and/or the auxiliary device interface means 35. The control signals are processed by IVIS 6 and/or the auxiliary device 7 respectively, which may cause a particular activity to be executed at the IVIS 6 and/or the auxiliary device 7. This may cause a desired interaction between the IVIS 6 and the auxiliary device 7. Typically the desired interaction is an interaction to be tested by the testing device 3.

During and/or after the desired interaction between the IVIS 6 and the auxiliary device 7 is being/has been performed, the IVIS 6 and/or the auxiliary device 7 will transmit response signals to the testing device 3 via the IVIS interface means 33 and the auxiliary device interface means 35 respectively. The response signals may be indicative of activity/status at the IVIS 6 and/or the auxiliary device 7 in response to the control signals. The response signals may be indicative of interoperation between the IVIS 6 and the auxiliary device 7.

Referring to FIG. 3, the storage means 41 further comprises IVIS/auxiliary device behaviour logging means 49 which generates a log of behaviour at the IVIS 6 and/or the auxiliary device based on the response signals. This log can be used to identify interoperability faults at the IVIS 6. Then it may be possible to modify the IVIS 6 to eradicate any identified faults, resulting in an improved IVIS 6.

The testing device 3 also comprises sound/image input/output interface means 51 and external computer interface means 53. The sound/image input/output interface means 51 is for connecting to and communicating with sound input/output and image input/output devices, such as the microphone 21 and speaker 23 which are described with reference to FIG. 1. The external computer interface means 53 is for connecting the testing device 3 to the external computer 30 which can be used in conjunction with the testing device 3.

Referring to FIG. 3, the storage means 41 comprises an auxiliary device look-up table 55, a desired activity look-up table 57 and an IVIS type look-up table 59. The auxiliary device lookup table 55 stores data items indicative of different auxiliary device types. For example, a type of auxiliary device type may be referred to by its make and model, for instance 'Apple® iPhone 5s®'. The desired activity look-up table 57 stores data items indicative of different types of desired activity to be performed at the IVIS 6 and the auxiliary device 7. For example, one type of desired activity may be referred to as 'turn auxiliary device on'. The IVIS type look-up table 59 stores data items indicative of different IVIS types which may be referred to by their make and model as with the auxiliary device types. Each one of the interoperability test instructions can be stored in association with an auxiliary device type or an IVIS type and a desired activity to be performed.

Referring to FIG. 4, the processing means comprises an interoperability test selector 61, which selects test instructions stored at the interoperability test instruction storage means 43. The selection is based on the type of auxiliary device or type of IVIS connected to the testing device 3 and the desired activity to be performed. Selected test instructions are then executed by the control means 47 in order to control the IVIS 6 and/or the auxiliary device 7.

Referring to FIG. 3, the storage means 41 comprises expected behaviour storage means 63 which stores the expected behaviour of the IVIS 6 and/or auxiliary device 7 in response to control signals generated based on particular test instructions. Fault identification means 68 at the processing means 45 compares the information from expected behaviour storage means 63 and the IVIS/auxiliary device behaviour logging means 49 in order to identify any mismatches. These mismatches are indicative of interoperability faults. Any identified faults are stored at fault logging means 66 at the storage means 41.

The storage means 41 comprises scheduled sequence storage means 65 which stores a schedule for a sequence of test instructions, or in other words a test routine. Referring to FIG. 4, the processing means 45 comprises a test routine scheduler 67 which executes the test routine by causing the interoperability test selector 61 to select test instructions from the interoperability test instruction storage means 43 in accordance with the test routine.

Figure 5:
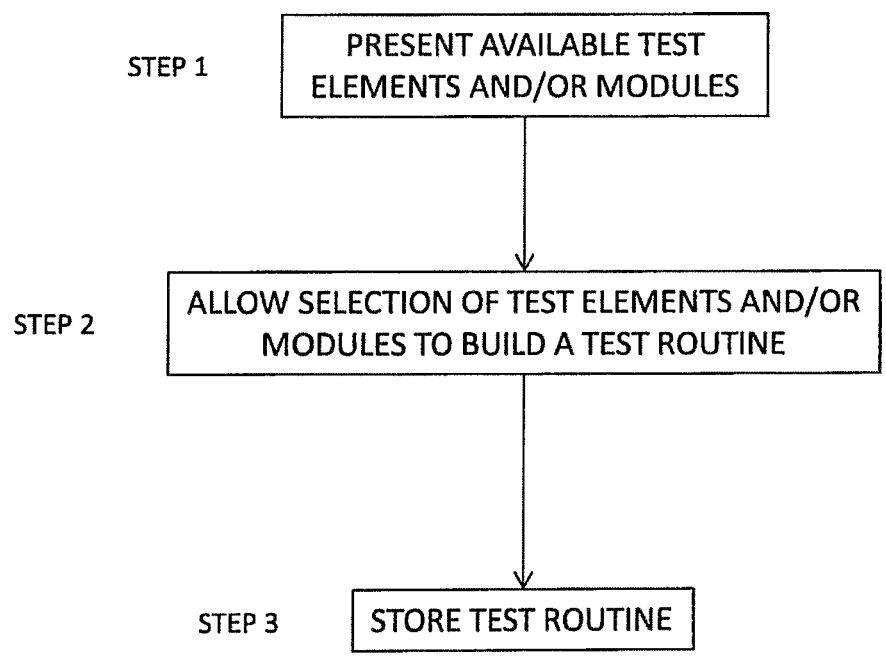
FIG. 5 shows a flow chart illustrating a method of storing a test routine.

Referring to FIG. 5, there is provided a method of storing a test routine for testing the interoperability of the IVIS 6 with the auxiliary device 7. In STEP 1, test elements, each associated with a desired activity, are presented to a user through a user interface. This may occur at the external computer 30. In another example, this step occurs at the testing device 3 by virtue of the touch-screen display 25. In STEP 2, the user selects the test elements in order to build a program. In Step 3, the user stores the test routine. The test routine is stored at the scheduled sequence storage means 65 at the testing device 3. This allows the testing device 3 to run the test routine when connected to the IVIS 6 and the auxiliary device 7, thus testing the interoperability of the IVIS 6.

Figure 6:
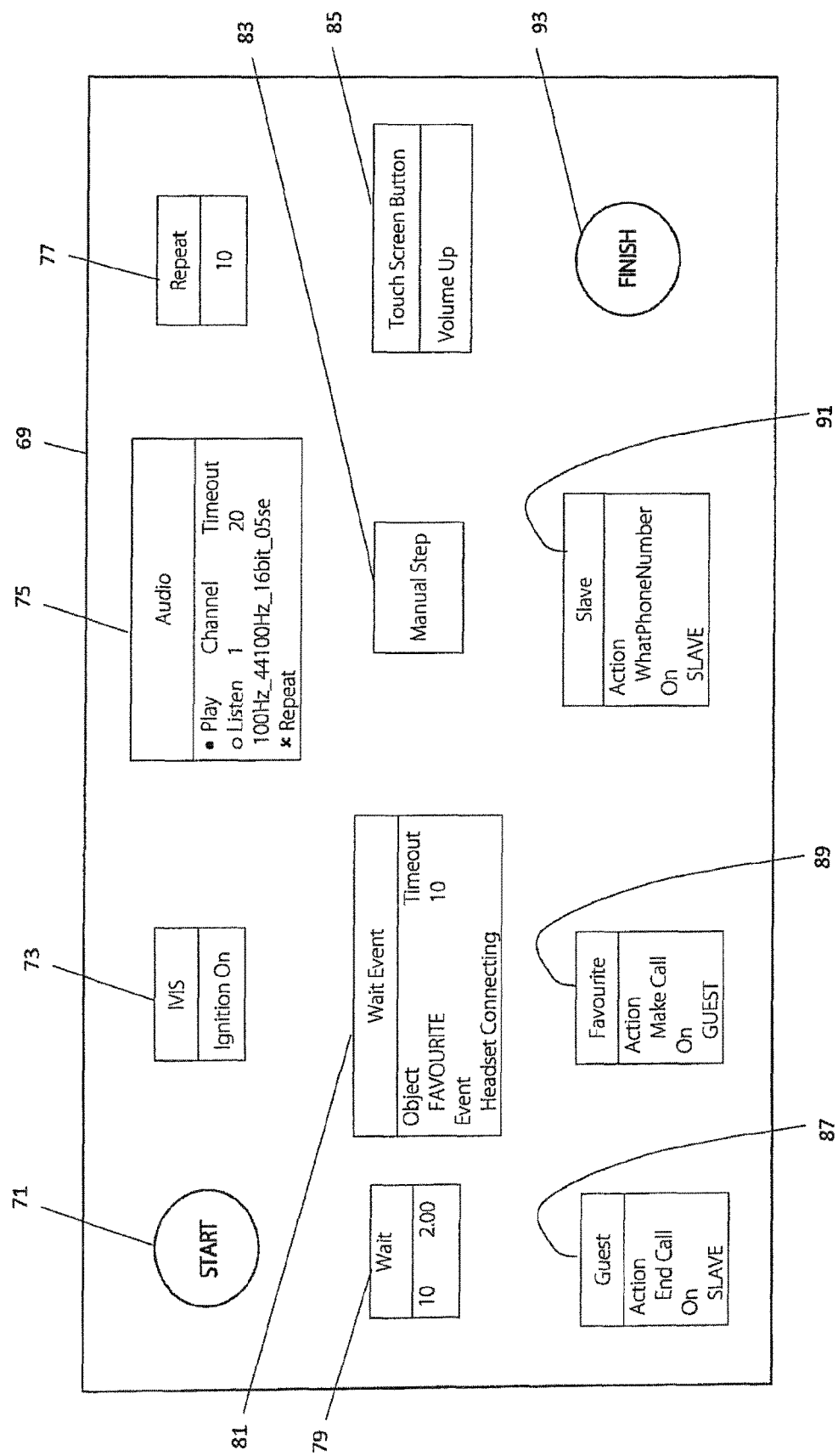
FIG. 6 shows an example of a user interface for creating a test routine.

Referring to FIG. 6, there is provided an example of the user interface 69. In this example, the user interface 69 displays a menu of test elements. Each test element corresponds with an interoperability test instruction. A test element may be, for example, associated with a desired activity to be performed at the auxiliary device 7, a desired activity to be performed at the IVIS 6 or a desired audio output at the speaker 23, amongst other desired activities. It will be appreciated that there is a large number of potential test elements, each of which associated with a different desired activity; however, only a small number of different types of test element have been used as examples here in the interests of brevity.

The 'start' test element 71 initiates a stored test routine. The 'IVIS' test element 73 schedules an activity at the IVIS, which in this example is activation of the IVIS 6 by simulating activation of the vehicle ignition. The 'audio' test element 75 outputs audio at the speaker 23. The 'repeat' test element 77 repeats a selected test routine or a part thereof.

The 'wait' test element 79 causes a pre-selected delay during a test routine, which in this example is a random delay anywhere between 8 and 12 seconds. The value 10 denotes the middle of the range of possible delay times. The value 2.00 denotes the range of possible delay times.

The 'wait event' test element 81 causes the test routine to wait for a pre-selected activity to be completed before proceeding. In this example, the pre-selected activity is the establishment of a headset connection between the IVIS 6 and a mobile telephone 7 before a timeout of ten seconds. A headset connection between the IVIS 6 and the mobile telephone 7 is one where the IVIS 6 acts like a headset for the mobile telephone 7.

The 'manual step' element 83 pauses the test routine so that an operator can perform a manual activity. The 'manual step' element 83 may cause the touch-screen display 25 to provide instructions to the operator for performing a manual test. The test routine may be re-initiated by the operator after the manual activity has been performed. The 'touch screen button' test element 85 schedules an activity at a touch screen at the IVIS 6, which in this example is simulating an interaction with the touch screen to increase the volume at the IVIS 6.

The 'guest' test element 87 schedules an activity at one of the auxiliary devices 7, which in this example is given the name 'guest'. The activity in this example is ending a telephone call at the 'guest' auxiliary device.

The 'favourite' test element 89 schedules an activity at another one of the auxiliary devices 7, which in this example is given the name 'favourite'. The activity in this example is placing a telephone call at the 'favourite' auxiliary device to the 'guest' auxiliary device.

The 'slave' test element 91 schedules an activity at another one of the auxiliary devices 7, which in this example is given the name 'slave'. The activity in this example is querying a telephone number at the 'slave' auxiliary device. The 'finish' test element 93 ends a stored test routine.

Figure 7:
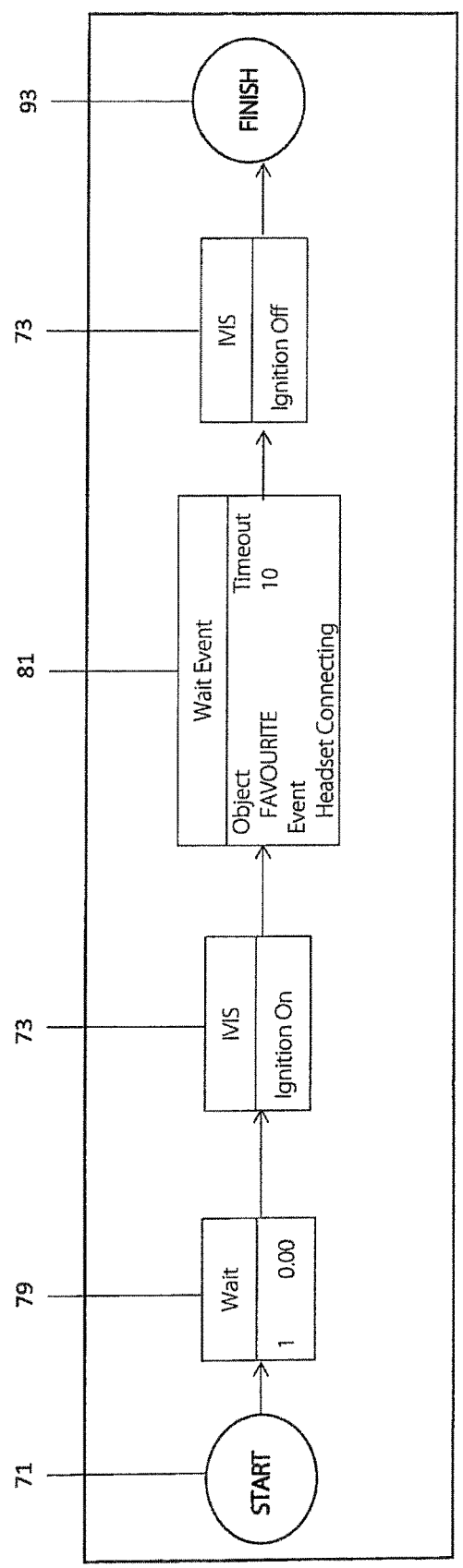
FIG. 7 shows an example test routine.

Referring to FIG. 7, there is provided an example of a stored test routine created by a user. Typically, a test routine is created by the user at the external computer 30. The user creates the test routine by arranging test elements from the user interface 69 into a specific order. In the example test routine, the 'start' element 71 initiates the test routine. Then, the 'wait' element 79 pauses the routine. Next, the 'IVIS' element 73 simulates the vehicle ignition turning on for the IVIS 6. This is done by using the interoperability test selection means 61 to select the relevant test instructions stored in the interoperability test instruction storage means 63. The test instructions will be selected based on the type of IVIS 6 and the activity referred to as 'ignition on'. The control means 47 generates control signals based on the selected test instructions and transmits the control signals to the IVIS 6 via the IVIS interface means 33. This simulates the vehicle ignition turning on for the IVIS 6.

Next, the 'wait event' element 81 causes the test routine to pause until a headset connection has been established between the IVIS 6 and the auxiliary device 7. Whether or not a headset connection has been established between the IVIS 6 and the auxiliary device 7 is determined based on response signals received via the IVIS interface means 33 and/or the auxiliary device interface means 35. Information related to these response signals are stored at the IVIS/auxiliary device behaviour logging means 49 for the purpose of determining whether or not a headset connection has been established between the IVIS 6 and the auxiliary device 7.

If a headset connection is not established after 10 seconds the test routine will identify an interoperability fault. Assuming a headset connection has been made, the 'IVIS' test element 73 simulates the vehicle ignition turning off. This is done by using the interoperability test selection means 61, the interoperability test instruction storage means 63, the control means 47 and the IVIS interface means 33 in a similar manner as described previously. However, in this case the control signals simulate the vehicle ignition turning off for the IVIS 6. The 'finish' test element 93 ends the test routine. The IVIS/auxiliary device behaviour logging means 49 stores a record of the results of the test routine which can be used to identify operability faults.

FIG. 13 illustrates an example of a possible log of the results of the test routine described above where the headset connection between the IVIS 6 and the auxiliary device 7 has been established. As an alternative, FIG. 14 illustrates an example of a possible log of the results of the test routine described above where the headset connection between the IVIS 6 and the auxiliary device 7 has not been established. Each success/failure indicator may be associated with relevant audio/image files obtained from the microphone 21/camera 24 which can be displayed to a user. This allows the user to determine the audio output or image displayed at the IVIS 6 or the auxiliary device 7 relevant to each test element.

Figure 8:
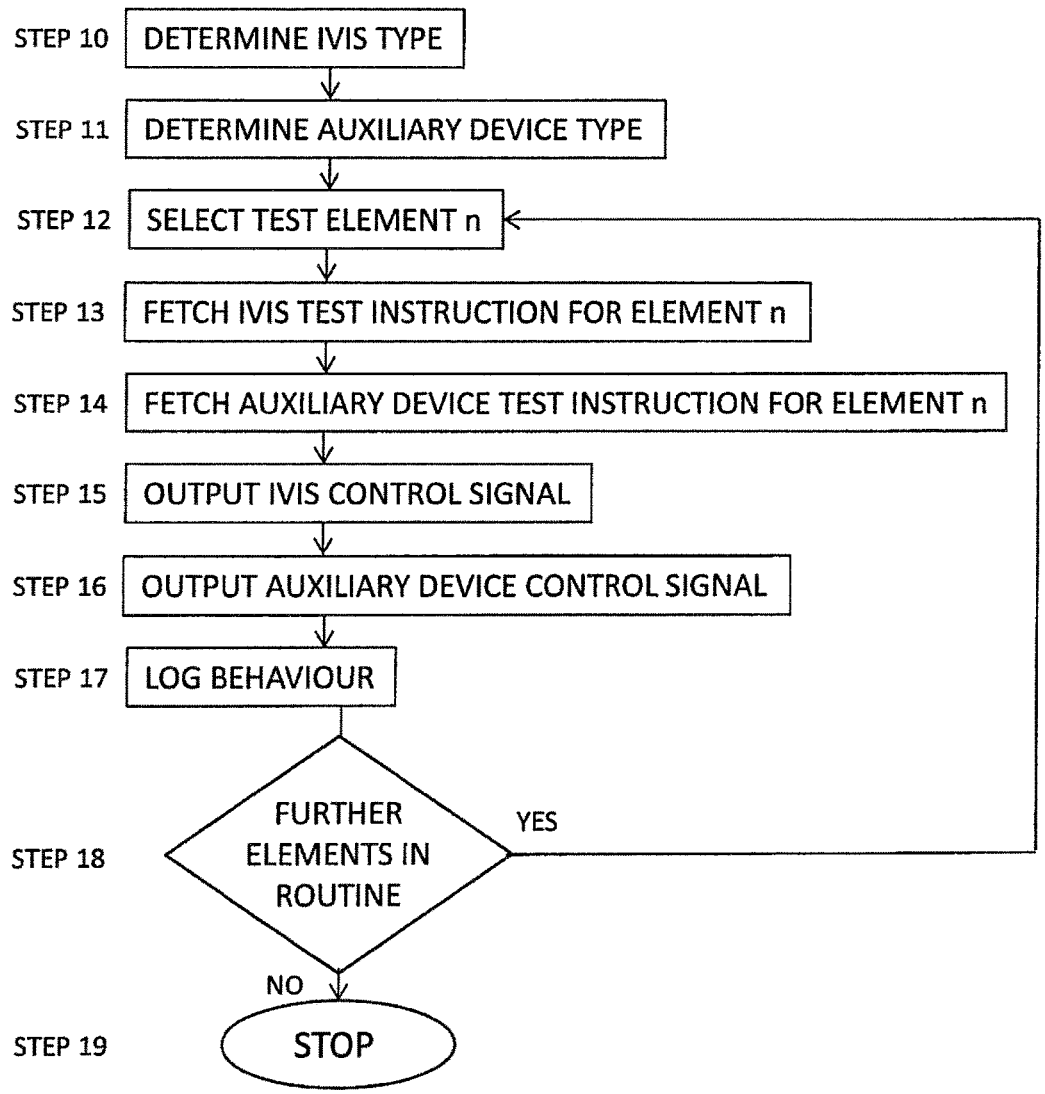
FIG. 8 shows a flow chart illustrating a method of executing a test routine.

Referring to FIG. 8, there is provided a method of executing a test routine at the testing device. In STEP 10 the type of IVIS 6 connected to the testing device 3 is determined. This is done by a user selecting the type of IVIS 6 from a list of possible IVIS types. In STEP 11 the type of auxiliary device 7 connected to the testing device 3 is determined. This is done using the auxiliary device identifier 36 described above.

In STEP 12 a first test element in the test routine is selected by the interoperability test selector 61. In STEP 13 the interoperability test selector 61 fetches the relevant IVIS test instructions for the first test element. In STEP 14 the interoperability test selector 61 fetches the relevant auxiliary device test instructions for the first test element. In STEP 15 the control means 47 outputs any IVIS control signals based on the relevant IVIS test instructions. In STEP 16 the control means 47 outputs any auxiliary device control signals based on the relevant auxiliary device test instructions. In STEP 17 the testing device 3 receives response signals and stores a log of the behaviour of the IVIS 6 and/or the auxiliary device 7.

In STEP 18 the method checks to see if there are any further test elements in the test routine. If there are further elements, STEPS 12 to 18 are repeated for the remaining test elements in the test routine until there are no further elements remaining. When there are no further elements, in STEP 19 the test routine ends.

Figure 9:
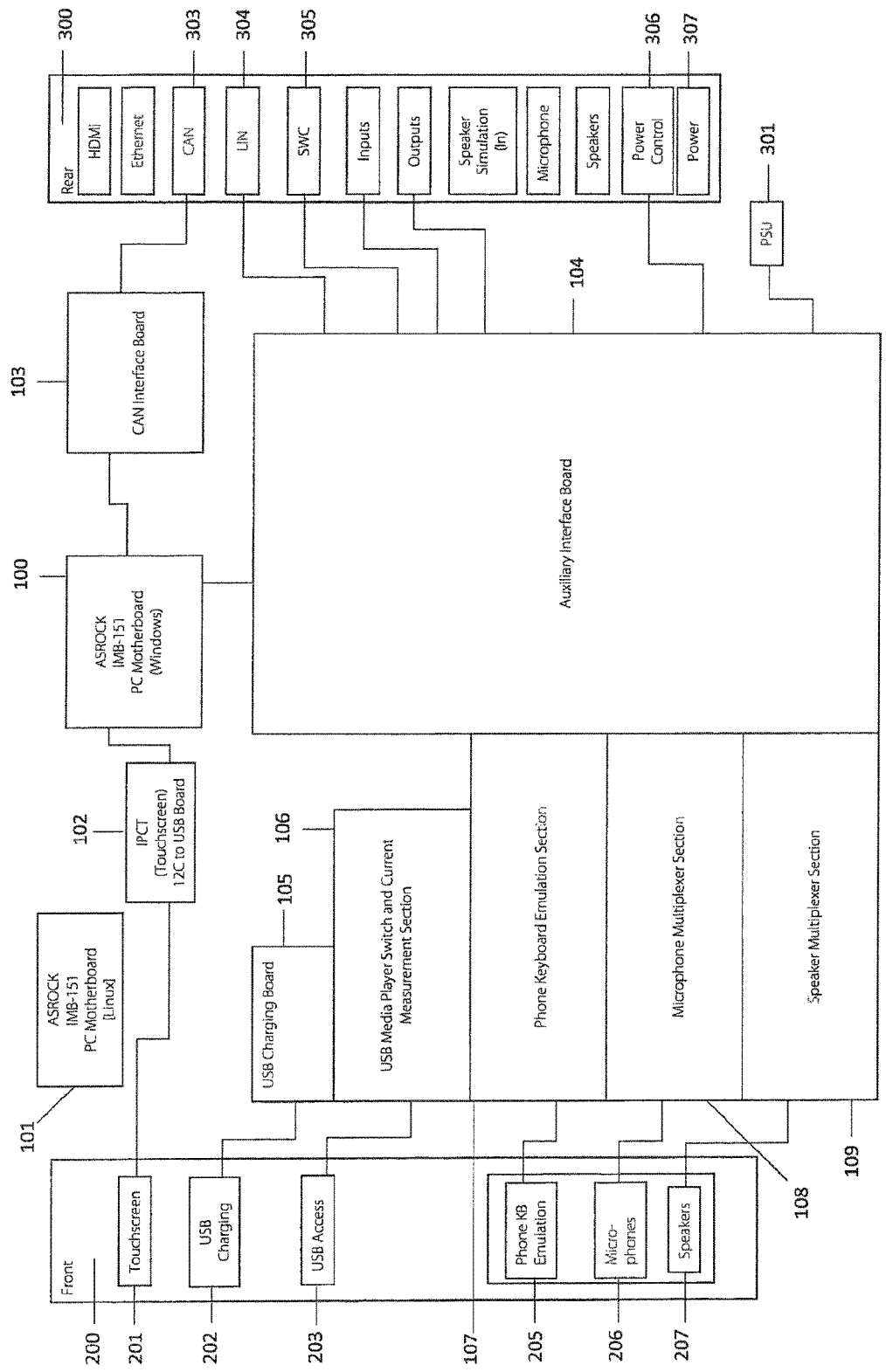
FIG. 9 shows a system block diagram of the testing device.

Referring to FIG. 9 the testing device 3 comprises two motherboards: a first motherboard 100 operating Windows® and a second motherboard 101 operating Linux®. The first motherboard 100 is connected to a touch screen controller 102 that controls a touch screen 201 on a front panel 200 of the testing device 3. The first motherboard 100 is also connected to a CAN interface board 103 with a CAN interface 303 on a rear panel 300 of the testing device 3. The CAN interface board 103 and the CAN interface 303 are used to communicate with the IVIS 6.

The first motherboard 100 is also connected to an auxiliary interface board 104 which in turn is connected to: a USB charging board 105, a USB media player switch and current measurement panel 106, a phone keyboard emulation section 107, a microphone multiplexer section 108 and a speaker multiplexer section 109. The USB charging board 105 is connected to a USB charging interface 202, on a front panel of the testing device 3, which is used to connect the testing device 3 to auxiliary devices 7 that would be charged by the IVIS 6 during normal operation of the IVIS 6. Therefore, the charging of USB devices by the IVIS 6 can be tested using the testing device 3.

The USB media player switch and current measurement section 106 is connected to a USB access interface 203 which is used to connect the testing device 3 to USB media player auxiliary devices. Therefore, the interoperability of the IVIS 6 with USB media player auxiliary devices can be tested using the testing device 3.

The phone keyboard emulation section 107 is connected to a phone keyboard emulation interface 205 which is used to connect the testing device 3 to auxiliary devices that can be controlled by an external keyboard, for instance smart phones. The phone keyboard emulation section 107 generates signals that simulate keyboard output signals which can be used to control auxiliary devices.

Figure 10:
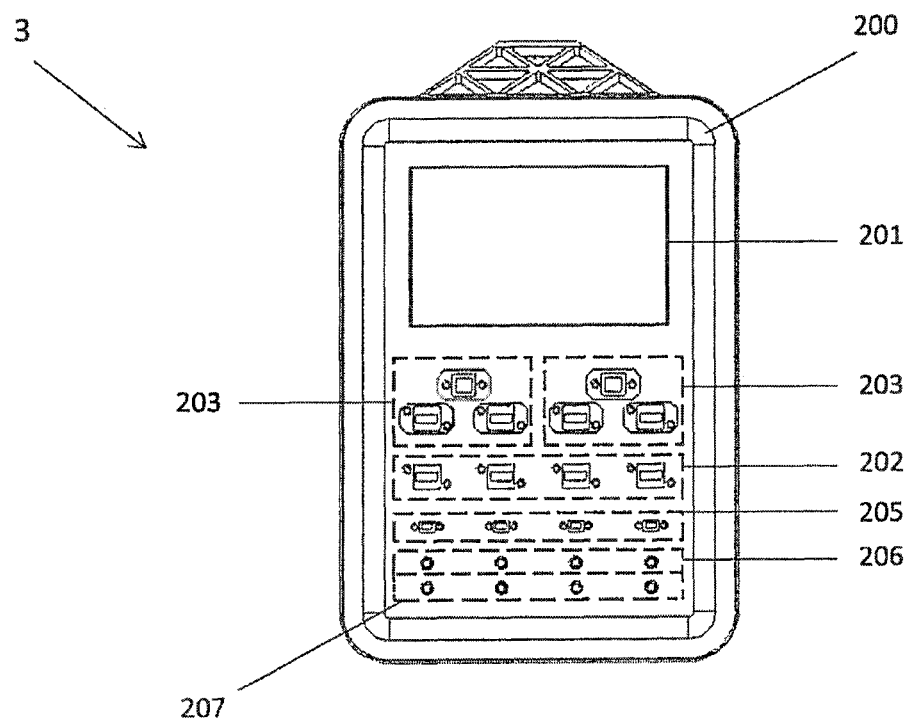
FIG. 10 shows a front view of the testing device.

The microphone multiplexer section 108 is connected to a microphone interface 206 for controlling a microphone, and the speaker multiplexer section 109 is connected to a speaker interface 207 for controlling a speaker. Therefore, sounds can be output into the microphone of an auxiliary device, and sounds output from a speaker of the auxiliary device can be recorded. The arrangement of the interfaces on the front panel 200 of the testing device may be understood with reference to FIG. 10.

Figure 11:
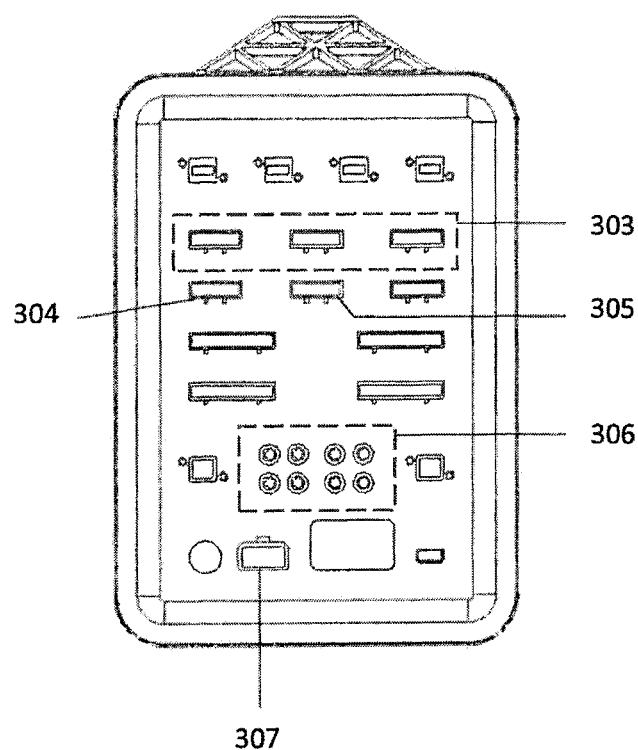
FIG. 11 shows a rear view of the testing device.

The auxiliary interface board 104 is also connected to a power supply unit 301 and a variety of interfaces on the rear panel 300. The variety of interfaces on the rear panel 300 include: a Local Interconnect Network (LIN) interface 304, a steering wheel controller (SWC) interface 305, a power control interface 306 and a power interface 307. The arrangement of the interfaces on the rear panel 300 of the testing device may be understood with reference to FIG. 11.

Figure 12:
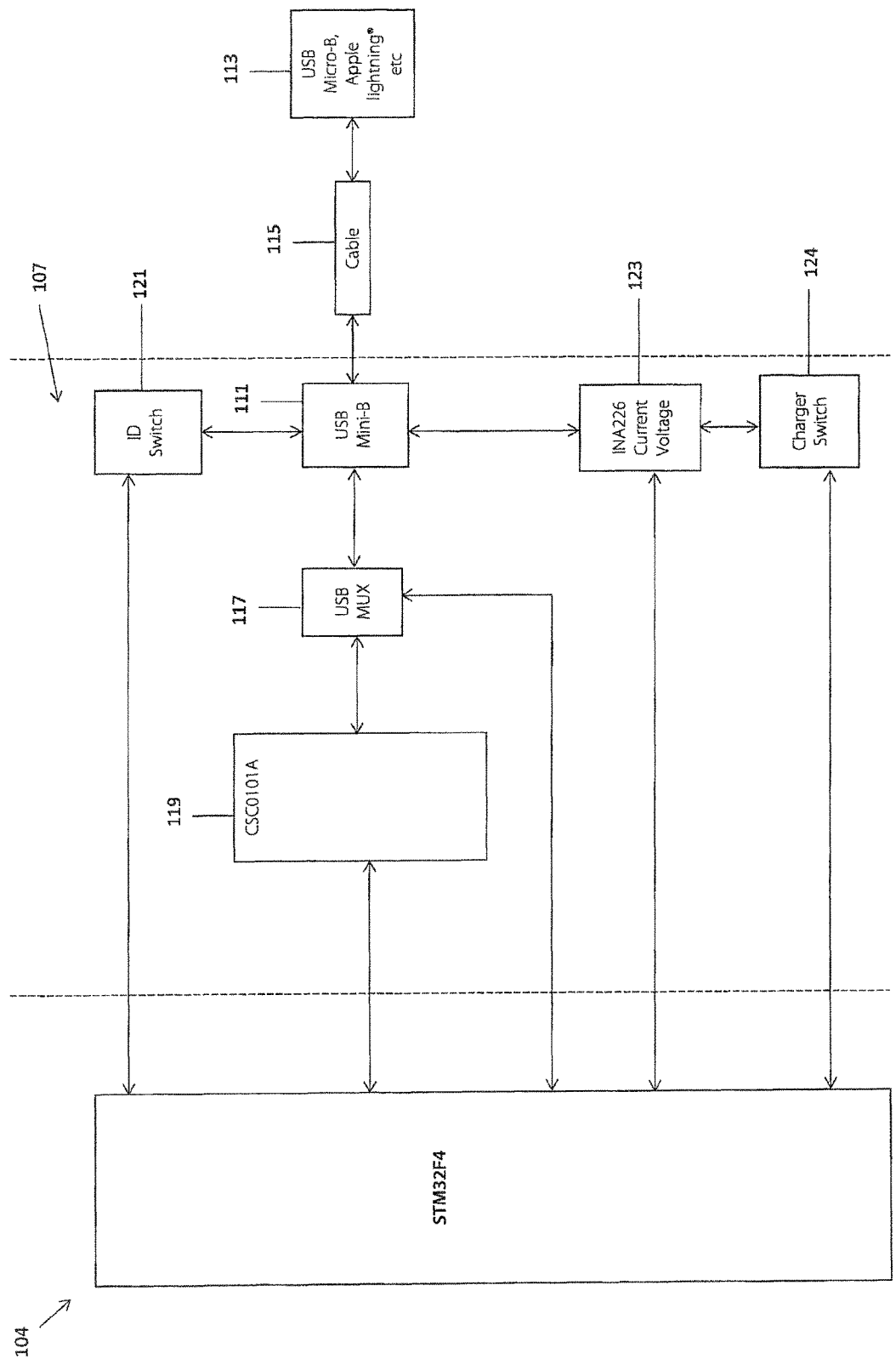
FIG. 12 schematically shows an overview of the phone keyboard emulation section of the testing device.

Referring to FIG. 12, the phone keyboard emulation section 107 comprises a USB Mini-B interface 111 which can to connect to a USB micro-B/Apple Lightning® interface 113 at an auxiliary device via a cable 115. The USB mini-B interface 111 at the phone keyboard emulation section 107 connects with a USB multiplexer which is connected to a conversion module 119, which in this case is a CSC0101A chip. The conversion module 119 receives PS2 type keyboard emulation signals from the auxiliary interface board and converts these signals into USB type signals. It has been found that this arrangement is a reliable way of ensuring that the testing device 3 is able to control many types of auxiliary device. There is a switch 121 for toggling between a mode where the USB mini-B interface 111 transmits keyboard emulation signals to the auxiliary device and a mode where USB mini-B interface 111 transmits power to the auxiliary device so that it can be charged.

The phone keyboard emulation section 107 further comprises current and voltage measuring means 124 and a charger switch 124. The current and voltage measuring means 124 measures the current and voltage supplied to the auxiliary device. The charger switch 124 is used to turn the power supply to the auxiliary device on and off.

Transmitting keyboard signals via the interface means as described above would not be appropriate for controlling Apple iPhone® devices. This is because external keyboards may only communicate with some Apple iPhone® devices via Bluetooth®. Since, in many situations, the testing device 3 is used to test the interoperability of the IVIS 6 with auxiliary devices via a Bluetooth® connection, the Bluetooth® connection at the auxiliary device is not available to receive keyboard emulation signals for control. Therefore, in order to solve this problem, the 'switch control' function is activated at the auxiliary device. The 'switch control' function is one of 'accessibility options' typically used to help disabled persons to interact with the auxiliary device. The 'switch control' function reacts to control signals input over a physical connection in order to control the auxiliary device. This allows the IVIS 6 to interact with the auxiliary device via Bluetooth® whilst allowing control of the auxiliary device via a physical connection.

Where the testing device has been described above in reference to one auxiliary device, it will be appreciated that the testing device would be appropriate for use with a plurality of auxiliary devices. Many different types of auxiliary device may be used with the testing device. Thus, any mention of a specific type of auxiliary device above is provided only as an example one type of auxiliary device.

It will be appreciated that the user interface process for creating test routines above allows the user to graphically create test instructions that are abstracted from and not dependent on the particular devices which are to be tested. Thus, similarly it will be appreciated that a test routine may be used in relation to more than one set of devices/test situations.

In a development, test elements can be created for any component in the test setup. Test elements may be created for external actuators and sensors that manipulate the test device and record external data. For example, test elements may be created for a robotic arm, which makes physical actions, or a sensor, which is able to recognise images or events. The connection between the IVIS and the actuators and/or sensors may be either a physical connection or a wireless connection.

The invention claimed is:

1. An in-vehicle infotainment system interoperability testing device for testing the interoperability between an in-vehicle infotainment system and an auxiliary device, the testing device comprising:
   in-vehicle infotainment system interface means arranged to communicatively connect the in-vehicle infotainment system with the testing device;
   auxiliary device interface means arranged to communicatively connect the auxiliary device with the testing device;

interoperability test instruction storage means arranged to store a plurality of interoperability test instructions for testing a desired interaction between the in-vehicle infotainment system and the auxiliary device;

control means arranged to generate auxiliary device control signals based on at least one of the test instructions;

the control signals arranged to be transmitted to the auxiliary device via the auxiliary device interface means, thus causing the desired interaction between the in-vehicle infotainment system and the auxiliary device; and in-vehicle infotainment system behavior logging means arranged to generate a log of behavior at the in-vehicle infotainment system in response to the control signals by receiving at least one response signal from the in-vehicle infotainment system via the in-vehicle infotainment system interface means, thereby outputting results of at least one interoperability test.

2. The testing device according to claim 1 wherein the control means is arranged to generate in-vehicle infotainment system control signals based on at least one of the test instructions; and the control signals are arranged to be transmitted to the in-vehicle infotainment system via the in-vehicle infotainment system interface means, thus causing the desired interaction between the in-vehicle infotainment system and the auxiliary device.

3. The testing device according to claim 1 where the control means is arranged to generate auxiliary device control signals which emulate the signals generated by a physical controller device.

4. The testing device according to claim 3 wherein the control means is arranged to generate auxiliary device control signals which emulate keyboard and/or mouse control signals.

5. The testing device according to claim 4 wherein the control means comprises a keyboard/mouse emulation section comprising a conversion module arranged to receive PS2 type signals and output USB type signals.

6. The testing device according to claim 1 further comprising:

auxiliary device behavior logging means arranged to generate a log of behavior at the auxiliary device in response to the control signals by receiving at least one response signal from the auxiliary device via the auxiliary device interface means; thereby outputting further results of the at least one interoperability test.

7. The testing device according to claim 1 further comprising:

an interoperability test selector arranged to select at least one of the plurality of interoperability test instructions;

wherein the control means is arranged to generate the control signals based on the selected interoperability test instruction.

8. The testing device according to claim 7 wherein some of the plurality of interoperability test instructions are associated with a type of auxiliary device and a desired activity to be performed at that type of auxiliary device; and the interoperability test selector is arranged to select at least one of the plurality of interoperability test instructions based on the type of the auxiliary device and the desired activity to be performed at the auxiliary device.

9. The testing device according to claim 7 wherein some of the plurality of interoperability test instructions are associated with a type of in-vehicle infotainment system and a desired activity to be performed at that type of in-vehicle infotainment system; and the interoperability test selector is arranged to select at least one of the plurality of interoperability test instructions based on the type of the in-vehicle infotainment system and the desired activity to be performed at the in-vehicle infotainment system.

10. The testing device according to claim 7 wherein at least some of the plurality of interoperability test instructions are associated with an external actuator and a desired activity to be performed at that external actuator; and the interoperability test selector is arranged to select at least one of the plurality of interoperability test instructions based on the type of the external actuator and the desired activity to be performed at the external actuator.

11. The testing device according to claim 10 wherein the external actuator is a robotic arm and the robotic arm is arranged to make physical actions to manipulate the in-vehicle infotainment system and/or the auxiliary device.

12. The testing device according to claim 7 wherein at least some of the plurality of interoperability test instructions are associated with a sensor and a desired activity to be performed at that sensor; and the interoperability test selector is arranged to select at least one of the plurality of interoperability test instructions based on the type of the sensor and the desired activity to be performed at the sensor.

13. The testing device according to claim 12 wherein the sensor is arranged to record external data and/or recognize events and/or recognize images.

14. The testing device according to claim 7 further comprising:

scheduled sequence storage means arranged to store a scheduled sequence of desired activities to be performed at the auxiliary device and/or the in-vehicle infotainment system;

wherein the interoperability test selector is arranged to select interoperability test instructions based on the scheduled sequence.

15. The testing device according to claim 7 further comprising: an interoperability test routine scheduler arranged to:

execute a first desired activity to be performed at the auxiliary device and/or the in-vehicle infotainment system by causing the interoperability test selector to select a first test instruction; and then execute a second desired activity to be performed at the auxiliary device and/or the in-vehicle infotainment system by causing the interoperability test selector to select a second test instruction, wherein the interoperability test routine scheduler is arranged to determine whether the first desired activity has been performed at the auxiliary device or the in-vehicle infotainment system using the behavior logging means; and the interoperability test routine scheduler is arranged to proceed to execute the second desired activity, if the first desired activity has been performed.

16. The testing device according to claim 14 further comprising a user interface arranged to allow a user to generate the scheduled sequence of desired activities to be performed at the auxiliary device and/or the in-vehicle infotainment system.

17. The testing device according to claim 16 wherein the user interface is arranged to allow a user to input delay instructions between desired activities to be performed at the auxiliary device and/or the in-vehicle infotainment system.

18. The testing device according to claim 16 wherein the delay instructions input by the user is a pre-selected delay, the pre-selected delay being a random delay.

19. The testing device according to claim 16 arranged to allow a user to input logical commands between the desired activities to be performed at the auxiliary device and/or the in-vehicle infotainment system.

20. The testing device according to claim 7 further comprising: auxiliary device identification means arranged to identify the type of the auxiliary device by analyzing signals received from the auxiliary device via the auxiliary device interface means; wherein the interoperability test selector may be arranged to select at least one of the plurality of interoperability test instructions based on the type of auxiliary device identified.

21. The testing device according to claim 1 further comprising:
   sound output interface means arranged to establish a connection between at least one sound output device, or a plurality of sound output devices, and the testing device;
   wherein the control means is arranged to generate sound output device control signals based on at least one of the test instructions; and
   wherein the control means is arranged to cause the control signals to be transmitted to the at least one sound output device, or plurality of sound output devices.

22. An interoperability testing system comprising:
   an in-vehicle infotainment system interoperability testing device;
   an in-vehicle infotainment system communicatively connected to the testing device;
   an auxiliary device communicatively connection to the testing device;
   the testing device comprising:
      interoperability test instruction storage means arranged to store a plurality of interoperability test instructions for testing a desired interaction between the in-vehicle infotainment system and the auxiliary device;
      control means arranged to generate auxiliary device control signals based on at least one of the test instructions;
      wherein the controls signals are arranged to be transmitted to the auxiliary device, thus causing the desired interaction between the in-vehicle infotainment system and the auxiliary device;
   the testing device further comprising:
      in-vehicle infotainment system behavior logging means arranged to generate a log of behavior at the in-vehicle infotainment system in response to the control signals by receiving at least one response signal from the in-vehicle infotainment system, thereby outputting results of at least one interoperability test.

23. A method of manufacturing an in-vehicle infotainment system, the method comprising the steps of:
   storing, at an in-vehicle infotainment system testing device, interoperability test instructions for testing a desired interaction between the in-vehicle infotainment system and an auxiliary device;
   communicatively connecting the in-vehicle infotainment system with the in-vehicle infotainment system testing device;
   communicatively connecting the auxiliary device with the testing device;
   generating auxiliary device control signals based on at least one of the test instructions;
   transmitting the auxiliary device control signals to the auxiliary device, thus causing the desired interaction between the in-vehicle infotainment system and the auxiliary device; and
   receiving at least one response signal from the in-vehicle infotainment system;
   generating a log of behavior at the in-vehicle infotainment system in response to the control signals, thereby outputting results of at least one interoperability test; and
   using results of the at least one interoperability test to manufacture an in-vehicle infotainment system.

24. An in-vehicle infotainment system interoperability testing device for testing the interoperability between an in-vehicle infotainment system and an auxiliary device, the testing device comprising:
   in-vehicle infotainment system interface means arranged to communicatively connect the in-vehicle infotainment system with the testing device;
   auxiliary device interface means arranged to communicatively connect the auxiliary device with the testing device;
   interoperability test instruction storage means arranged to store a plurality of interoperability test instructions for testing a desired interaction between the in-vehicle infotainment system and the auxiliary device;
   control means arranged to generate auxiliary device control signals based on at least one of the test instructions;
   the control signals arranged to be transmitted to the auxiliary device via the auxiliary device interface means, thus causing the desired interaction between the in-vehicle infotainment system and the auxiliary device; and
   in-vehicle infotainment system behavior logging means arranged to generate a log of behavior at the in-vehicle infotainment system in response to the control signals by receiving at least one response signal from the in-vehicle infotainment system via the in-vehicle infotainment system interface means, thereby outputting results of at least one interoperability test;
   an interoperability test selector arranged to select at least one of the plurality of interoperability test instructions, wherein the control means is arranged to generate the control signals based on the selected interoperability test instruction;
   scheduled sequence storage means arranged to store a scheduled sequence of desired activities to be performed at the auxiliary device and/or the in-vehicle infotainment system; wherein the interoperability test selector is arranged to select interoperability test instructions based on the scheduled sequence; and
   a user interface arranged to allow a user to generate the scheduled sequence of desired activities to be performed at the auxiliary device and/or the in-vehicle infotainment system, wherein the user interface allows a user to graphically build the scheduled sequence of desired activities by selecting one or more of a plurality of available test elements.

25. A method of testing the interoperability of an in-vehicle infotainment system with an auxiliary device using an in-vehicle infotainment system testing device, the method comprising the steps of:
   storing interoperability test instructions for testing a desired interaction between the in-vehicle infotainment system and the auxiliary device;
   communicatively connecting the in-vehicle infotainment system with the in-vehicle infotainment system testing device;
   communicatively connecting the auxiliary device with the testing device;

generating auxiliary device control signals based on at least one of the interoperability test instructions;

transmitting the control signals to the auxiliary device, thus causing the desired interaction between the in-vehicle infotainment system and the auxiliary device;

receiving at least one response signal from the in-vehicle infotainment system;

generating a log of behavior at the in-vehicle infotainment system in response to the control signals, thereby outputting results of at least one interoperability test;

wherein the method comprises the further steps of:

allowing a user to generate a scheduled sequence of desired activities to be performed at the auxiliary device and/or the in-vehicle infotainment system using a user interface, wherein the user interface allows a user to graphically build the scheduled sequence of desired activities by selecting one or more of a plurality of available test elements;

storing a scheduled sequence of desired activities to be performed at the auxiliary device and/or the in-vehicle infotainment system; and selecting interoperability test instructions based on the scheduled sequence with the control signals being based on the selected interoperability test instructions.

26. A computer program product comprising a computer readable storage medium carrying an executable computer program comprising code portions, which when loaded and run on an in-vehicle infotainment system testing device, cause the in-vehicle infotainment testing device to execute a method of testing the interoperability between an in-vehicle infotainment system and an auxiliary device, the method comprising the steps of claim 25.

27. A computer program for building a scheduled sequence of desired activities for use with an in-vehicle infotainment interoperability system testing device according to claim 1 which comprises code portions which, when executed on a computer, cause the computer to execute a method comprising the steps of:

presenting the user with a graphical user interface, displaying a plurality of test elements within the graphical user interface, and allowing their selection and ordering by a user to create a scheduled sequence of desired activities for output to an in-vehicle infotainment interoperability system testing device.

28. The testing device according to claim 1 wherein the testing device is a portable self-contained unit.

29. The computer program of claim 27 wherein the method further comprises the step of:

outputting the scheduled sequence of desired activities for input to an in-vehicle infotainment interoperability system testing device, the scheduled sequence comprising a plurality of interoperability test instructions, and wherein the test instructions are such that when loaded and run by the in-vehicle infotainment interoperability system testing device the test instructions cause the testing device to perform the sequence of desired activities.

30. A scheduled sequence of activities for use with an in-vehicle infotainment interoperability system testing device according to claim 1 which comprises a plurality of interoperability test instructions which, when executed on the in-vehicle infotainment interoperability system testing device causes the testing device to execute a method comprising the steps of:

communicatively connecting to the in-vehicle infotainment system;

communicatively connecting to the auxiliary device;

generating auxiliary device control signals based on at least one of the interoperability test instructions; and transmitting the control signals to the auxiliary device, thus causing a desired interaction between the in-vehicle infotainment system and the auxiliary device.

* * * * *